United States Patent
Zanker

(10) Patent No.: US 6,651,514 B2
(45) Date of Patent: Nov. 25, 2003

(54) DUAL FUNCTION FLOW CONDITIONER AND CHECK METER

(75) Inventor: Klaus Joachim Zanker, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 09/991,806

(22) Filed: Nov. 16, 2001

(65) Prior Publication Data

US 2003/0094052 A1 May 22, 2003

(51) Int. Cl.⁷ .................................................. G01F 1/37
(52) U.S. Cl. ...................................................... 73/861.52
(58) Field of Search ........................ 73/861.52, 861.83, 73/861.81, 861.04, 861.02, 861.03, 861.28, 861.65, 66.44, 861.29

(56) References Cited

U.S. PATENT DOCUMENTS

| | | | |
|---|---|---|---|
| 2,929,248 A | 3/1960 | Sprenkle ...................... 73/198 |
| 3,840,051 A | 10/1974 | Akashi et al. ................. 138/37 |
| 4,646,575 A | 3/1987 | O'Hair et al. ............ 73/861.31 |
| 4,875,377 A * | 10/1989 | Robertson ................ 73/861.02 |
| 5,138,888 A * | 8/1992 | Walmer, Sr. ............. 73/861.83 |
| 5,495,872 A | 3/1996 | Gallagher et al. ............ 138/44 |
| 5,529,093 A | 6/1996 | Gallagher et al. ............ 138/44 |
| 5,546,812 A | 8/1996 | Drenthen .................. 73/861.29 |
| 5,597,961 A * | 1/1997 | Marrelli ...................... 73/61.44 |
| 5,654,551 A * | 8/1997 | Watt et al. ................. 250/356.1 |
| 5,705,753 A * | 1/1998 | Hastings et al. .............. 73/597 |
| 5,762,107 A | 6/1998 | Laws ........................... 138/44 |
| 5,773,726 A * | 6/1998 | Mahoney et al. ......... 73/861.65 |
| 6,298,735 B1 * | 10/2001 | Dias et al. ............... 73/861.29 |

FOREIGN PATENT DOCUMENTS

| | | | |
|---|---|---|---|
| EP | 0 639 776 | 12/1997 | ............. G01P/5/00 |
| GB | 2 235 064 | 2/1991 | ............. F15D/1/02 |
| WO | WO 91/01452 | 2/1991 | ............. F15D/1/02 |

* cited by examiner

Primary Examiner—Edward Lefkowitz
Assistant Examiner—Jewel V. Thompson
(74) Attorney, Agent, or Firm—Conley Rose, P.C.

(57) ABSTRACT

A measurement system is described that includes a flow conditioner for performing the dual functions of conditioning the flow stream and acting as a check meter to the primary meter. Various flow stream characteristics are calculated from the measured differential pressure across the flow conditioner. These calculated values are compared to measurements made by the primary meter for the purpose of identifying performance or accuracy problems in the measurement equipment.

20 Claims, 3 Drawing Sheets

DUAL FUNCTION FLOW CONDITIONER AND CHECK METER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to methods and apparatus for monitoring characteristics of a flow stream in a pipeline. More precisely, the present invention relates to the novel application of using a flow conditioner in conjunction with a flowmeter to measure and compare several properties of a flow stream, including volumetric flow rate, speed of sound, and density of the flow stream.

Pipelines transport a large percentage of the liquid and gaseous fossil fuel products used in the world today. It is critical to both industry operations and fiscal accountability to accurately monitor and meter these products as they are transported through pipeline systems. Therefore, pipeline monitoring and metering operations must be accurate, reliable, and cost effective over a wide range of conditions.

One of the most common flowmeters in use today is the orifice meter. FIG. 1 depicts an orifice meter 50 comprising a fitting 52 having ends 54, 56 for installing the meter 50 directly into the piping section 70, typically by bolting or welding. Housed internally of the fitting 52 is a thin plate 58 that extends across the diameter of the piping section 70, oriented perpendicular to the direction of the flow stream 75, as indicated by the flow arrows. The thin plate 58 includes a bore or opening (orifice 55), that is typically concentric, but may also be eccentric.

In operation, when the flow stream 75 reaches the orifice plate 58, the flow is forced through the orifice 55, thereby constricting the cross-sectional flow area. Due to the principal of continuity, the mass flow rate entering the orifice 55 must equal the mass flow rate exiting the orifice 55. Therefore, because the cross-sectional area of flow is reduced at the orifice 55, the flow velocity through the orifice 55 increases to maintain the mass flow rate. Further, due to the principle of the conservation of energy, because the velocity of the flow increases through the orifice 55, the corresponding pressure must decrease.

Thus, the volumetric flow rate ($Q_{\Delta p}$) through an orifice 55 having a small diameter (d) within a piping section having a larger diameter (D) is given by:

$$Q_{\Delta p} = CEA_o \sqrt{\frac{2\Delta p_o}{\rho_k}} \quad \text{where} \tag{1}$$

$$E = \frac{1}{\sqrt{1-\beta^4}} = \text{velocity of approach factor} \tag{2}$$

$$A_o = \frac{\pi d^2}{4}, \text{ and} \tag{3}$$

$$\beta = \frac{d}{D}, \text{ and where} \tag{4}$$

C is the discharge coefficient, which is a function of $\beta$ and the Reynolds number, and $C \approx 0.6$. When an orifice meter 50 is used to measure volumetric flow rate ($Q_{\Delta p}$), the differential pressure ($\Delta p^1{}_o$) across the orifice plate 58 is measured utilizing a differential pressure transducer 60. The transducer 60 is connected across the orifice plate 58 via upstream pressure tap 62 and downstream pressure tap 64 to measure the differential pressure ($\Delta p_o$). Further, a known value of density ($\rho_k$) of the flow stream is provided, which may be determined using the pressure and temperature of the flow stream and compressibility data compiled and published by a standards-producing agency such as the American Gas Association (AGA) or the American Petroleum Institute (API). Alternatively, the density ($\rho_k$) value may be measured online using a device, such as a densitometer (not shown). Then, from the above equations (1) through (4), using a known value of C, and calculated values for E and $A_o$, the volumetric flow rate through the orifice ($Q\Delta_p$) can be calculated.

Another type of flowmeter commonly utilized today is the ultrasonic flowmeter. Ultrasonic flowmeters determine flow stream properties by transmitting ultrasonic waves across a known path length through the flow stream, receiving the ultrasonic waves, and measuring the transit time for those waves to travel across the known path length. The transit time of the ultrasonic waves are then used to determine the velocity of the fluid. As shown in FIG. 2, a typical ultrasonic flowmeter has at least two opposing transducers 20, 30 that are oriented at an angle ($\alpha$) to the direction of the flow stream 25, as indicated by the flow arrow. Ultrasonic waves are transmitted from transducer 20 toward transducer 30 along flow path 22 and from transducer 30 toward transducer 20 along flow path 32. The transit time of the ultrasonic waves in each direction is recorded by a processor (not shown). The two transit times, $t_1$ and $t_2$, are represented by the following equations:

$$t_1 = \frac{L}{c_{us} + V_{us}\left(\frac{X}{L}\right)} \quad \text{and} \tag{5}$$

$$t_2 = \frac{L}{c_{us} - V_{us}\left(\frac{X}{L}\right)}, \tag{6}$$

where $c_{us}$ is the speed of sound in the flow medium, X is the distance between the transducers parallel to the flow direction, as shown in FIG. 2, L is the straight line distance between the two transducers, as shown in FIG. 2, and $V_{us}$ is the average velocity of the flow. Equation (5) for transit time $t_1$ includes a positive velocity term due to the flow path 22 of the ultrasonic wave being generally in the same direction as the direction of flow 25. In contrast, equation (6) for transit time $t_2$ includes a negative velocity term due to the flow path 32 of the ultrasonic wave being generally opposed to the direction of flow 25. Solving equations (5) and (6) simultaneously for the two unknowns ($V_{us}$ and $c_{us}$) yields:

$$V_{us} = \frac{L^2}{2X}\left(\frac{t_2 - t_1}{t_1 \times t_2}\right) \quad \text{and} \tag{7}$$

$$c_{us} = \frac{L}{2}\left(\frac{t_1 + t_2}{t_1 \times t_2}\right) \tag{8}$$

Therefore, for a single pair of ultrasonic transducers 20, 30, the average velocity of the flow stream ($V_{us}$) and the speed of sound in the flow stream ($c_{us}$) can be determined by knowing the geometric configuration of the transducers relative to the piping (X, L) and measuring the transit times ($t_1$, $t_2$) of the ultrasonic waves. Ultrasonic meters have the advantage of providing flow stream data without obstructing the flow through the pipeline. Examples of ultrasonic flowmeters are shown and described in U.S. Pat. No. 4,646,575 and U.S. Pat. No. 5,546,812, both of which are hereby incorporated herein by reference for all purposes.

Velocity of a flow stream as it moves through a pipeline can be determined by an ultrasonic meter, as described above, or by other types of velocity meters, such as turbine, vortex, or electro-magnetic velocity meters. For any such velocity meter, once the velocity of the flow stream ($V_{vm}$) is determined, and the cross-sectional area of the pipe ($A_p$) is calculated, the volumetric flow rate ($Q_{vm}$) can be determined from the following equation:

$$Q_{vm} = V_{vm} \times A_p \tag{9}$$

The reliability of any flowmeter depends upon the quality of the flow stream being measured. To provide the most accurate and reliable measurements, the flow stream should be fully developed with a symmetric velocity profile. The flow stream should also be free of swirls and other flow anomalies. An ideal, fully developed flow stream is only achievable in closely controlled laboratory situations, but such conditions can be approximated in industrial applications using a few known methods, either alone or in combination. All of the methods used to approximate a fully developed flow involve isolating the flowmeter from any disturbances caused by pipeline features such as bends, variations in piping diameter, or other meters.

One method used to approximate a fully developed flow stream is to provide a long, straight length (run) of pipe upstream of the flowmeter. Any pipeline-created anomalies will dissipate as the flow stream travels through this long run of pipe. However, the lengths of straight pipe required to sufficiently develop the flow can be in excess of one hundred times the diameter of the pipe. Therefore, flow conditioners have been developed to shorten the distance of straight pipe required to approximate a fully developed flow. Flow conditioners generally comprise a series of restricted flow paths and settling chambers that function to decrease or eliminate pipeline-induced disturbances as the flow moves through the flow conditioner. Some flow conditioners reduce disturbances in the flow so effectively that as few as seven pipe diameters of straight pipe are required between the end of the flow conditioner and the flowmeter. Thus, in order to provide suitable flow quality in the shortest possible piping run, metering systems commonly include flow conditioners. Examples of flow conditioners are shown and described in U.S. Pat. No. 5,529,093, U.S. Pat. No. 5,495,872, U.S. Pat. No. 5,762,107, U.S. Pat. No. 3,840,051, and U.S. Pat. No. 2,929,248 all of which are hereby incorporated herein by reference for all purposes.

It is also desirable to measure the density of the fluid flowing though a pipeline in order to monitor the characteristics of the fluid and adjust volumetric flow measurements accordingly. Density is often determined using compressibility data compiled and published by a standards-producing agency such as the American Gas Association (AGA) or the American Petroleum Institute (API). This compressibility data may be provided, for example, in a commercially available software package that determines the density of a known fluid based on pressure and temperature inputs. The most common of these computer applications is known as AGA-8 and is based on the AGA Report No. 8 entitled "Compressibility of Natural Gas and Other Related Hydrocarbon Gases."

Pipeline monitoring and metering stations often include multiple flowmeters and other instrumentation to ensure accurate and reliable measurement of the flow rate through a pipeline. Typically, a primary meter is used for custody transfer purposes and one or more additional flowmeters are used as check meters to verify the measurements made by the primary meter. The check meters provide backup data, allowing pipeline operators to determine if changes in the flow rate measured by the primary meter result from actual pipeline flow rate changes or from a malfunction in the primary measuring device.

The present invention seeks to provide a less expensive alternative to present systems of multiple flowmeters, while retaining the functions of a check meter.

SUMMARY OF THE INVENTION

The methods and apparatus of the present invention include a measurement system having a flow conditioner, a primary flowmeter, and a processor. The processor uses at least two different methods to calculate the flow rate and density of the flow stream from various measurements, including the measured differential pressure across the flow conditioner. The processor compares and checks the calculated quantities against measured data. Thus, the present invention includes a combination flow conditioner, flow meter, and check meter. Therefore, the present invention finds a beneficial use in improving the accuracy and reliability of flow measurement while decreasing the capital costs of a measurement system.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1:
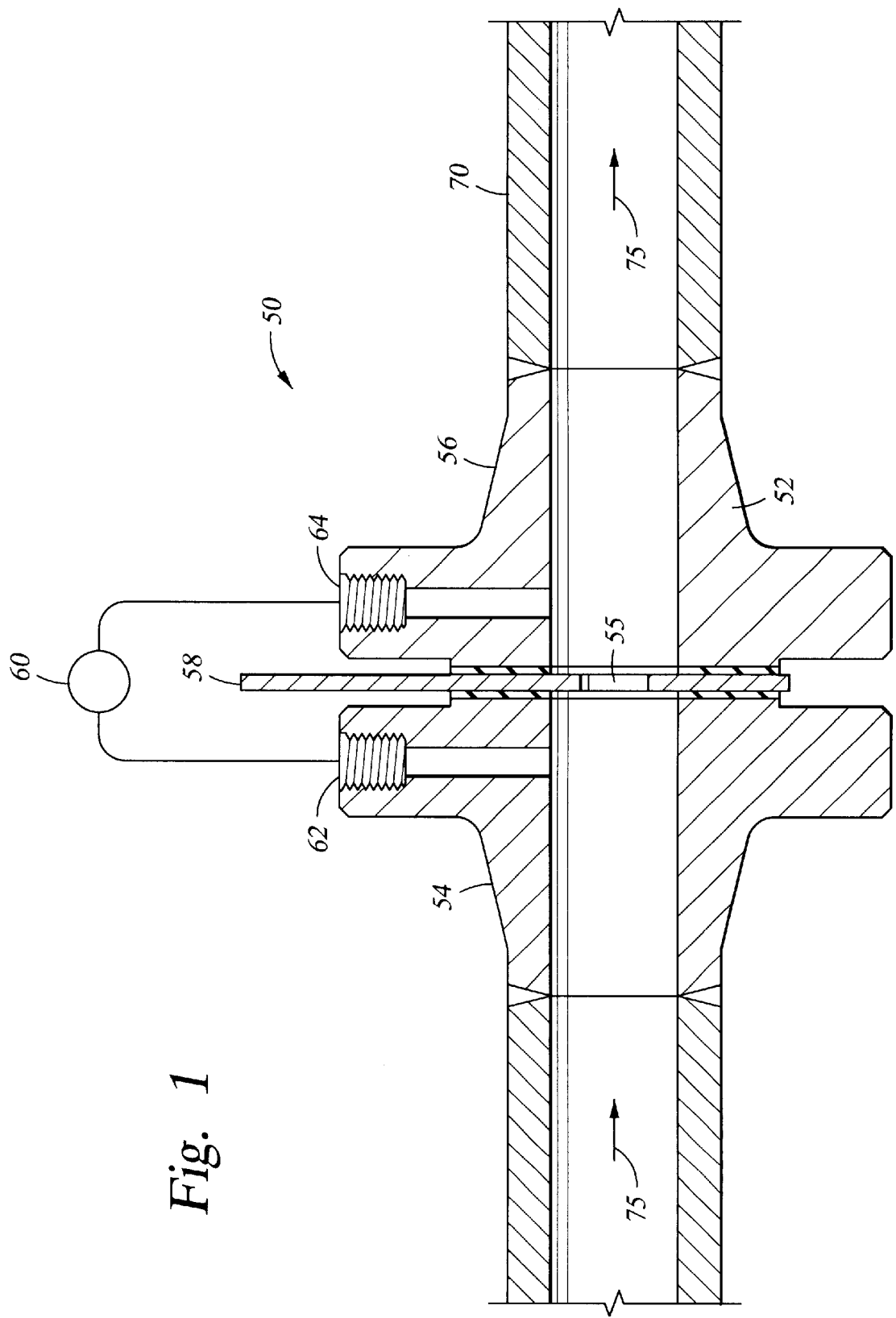
FIG. 1 is a schematic, cross-sectional view of an orifice meter mounted in a pipeline section.
Figure 2:
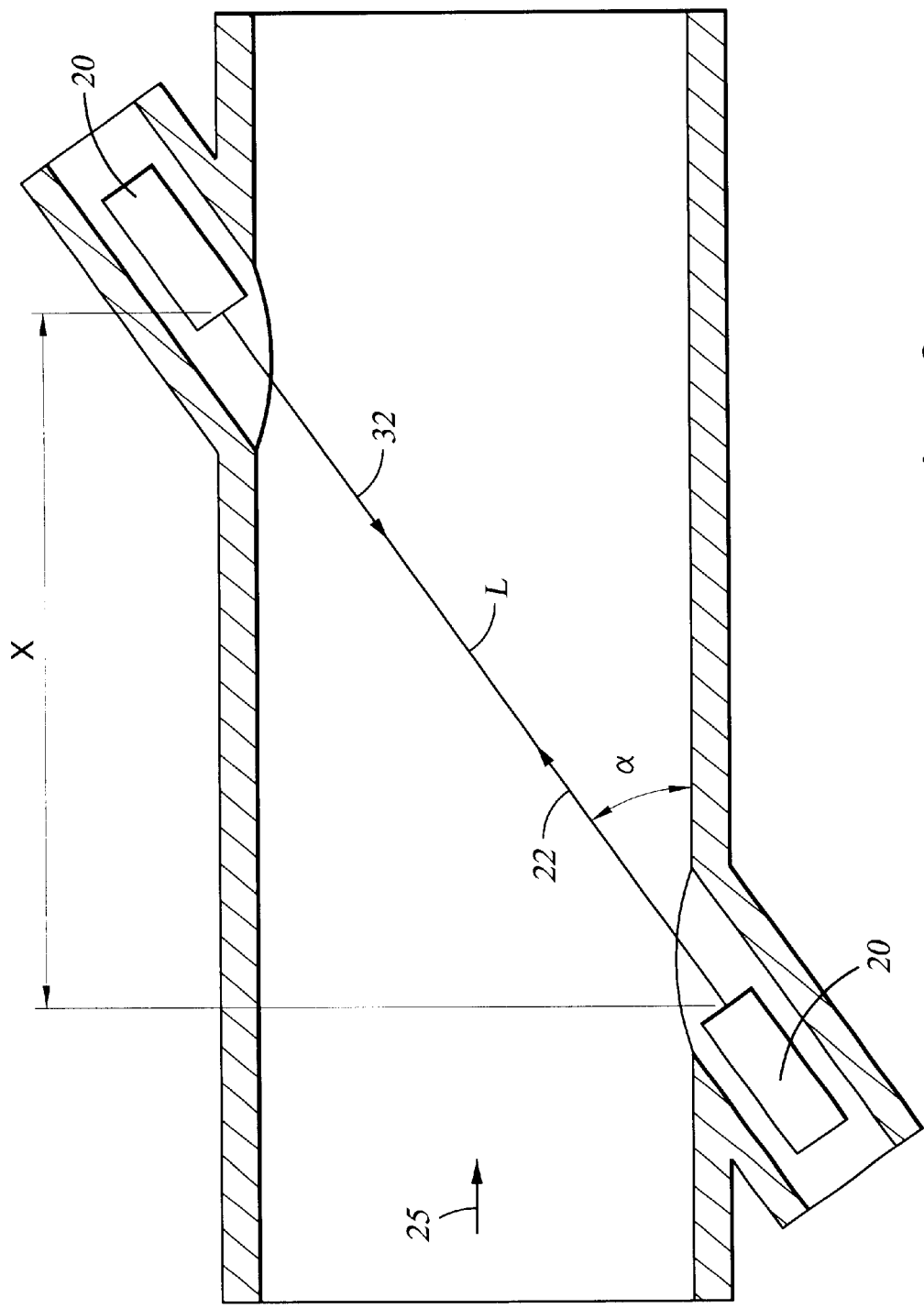
FIG. 2 is a schematic, cross-sectional view of a pipeline section depicting the operation of an ultrasonic flowmeter.
Figure 3:
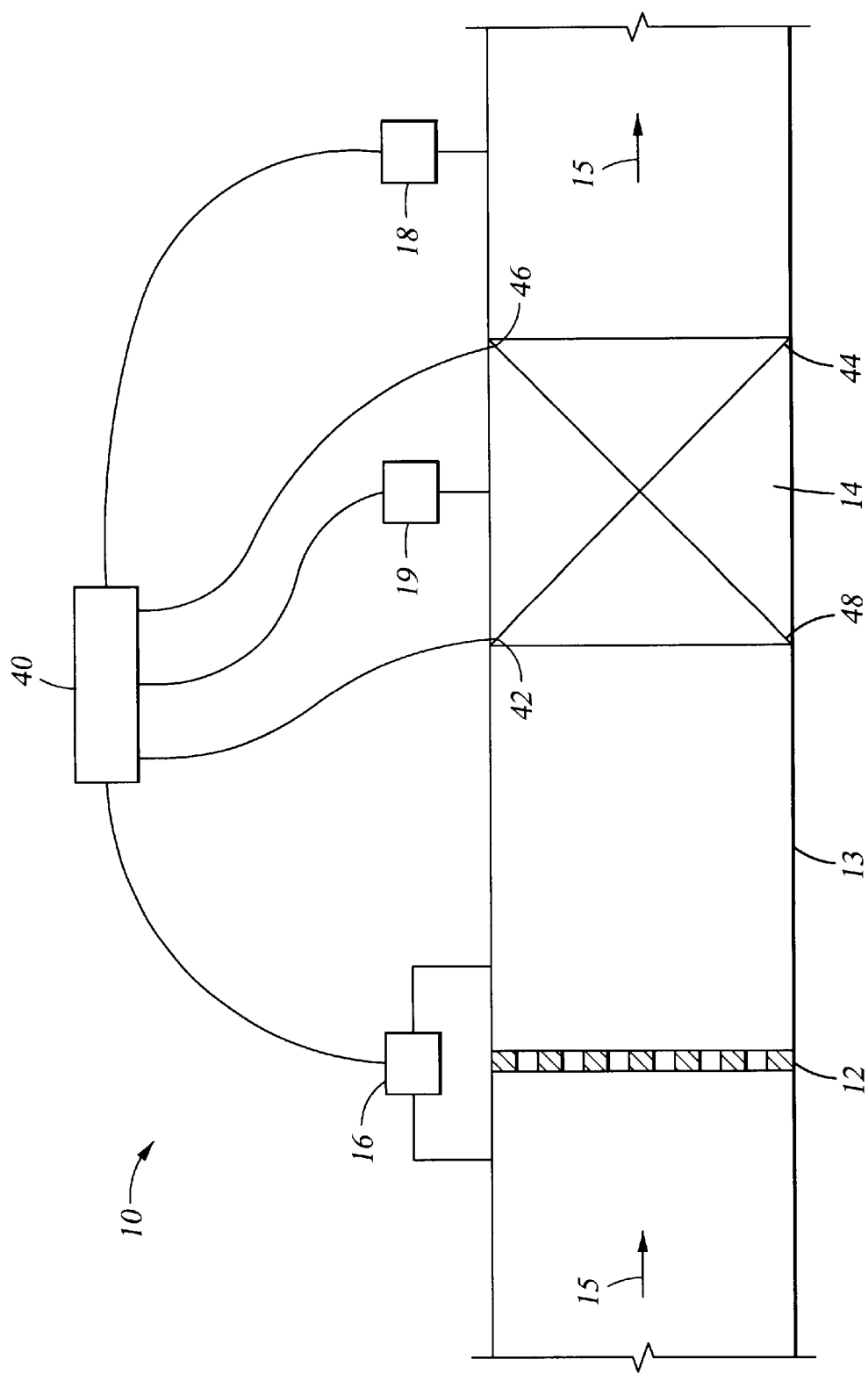
FIG. 3 is a schematic view of one embodiment of the present invention.

As shown in FIG. 3, one embodiment of the present invention is a measurement system 10 comprising a flow conditioner 12 and a flowmeter 14 mounted in a pipeline section 13. A flow stream 15 moves through the pipeline section 13 in the direction of the flow arrows. A differential pressure sensing device 16, such as a transducer, is arranged to measure the differential pressure across the flow conditioner 12. A temperature transducer 18 and a pressure transducer 19 are positioned along the pipeline section 13 to measure the temperature and pressure of the flow stream 15. The flowmeter 14, differential pressure sensing device 16, temperature transducer 18, and pressure transducer 19 are all electrically connected to a processor 40.

The flow conditioner 12 can be of any known configuration, such as, for example, a thin plate with a plurality of holes for the flow stream 15 to pass therethrough so that a substantially swirl-free, axisymmetric flow exits the flow conditioner 12. The flow conditioner 12 restricts the flow, thereby causing a pressure drop across the flow conditioner 12.

The flowmeter 14 can be any known device used for measuring flow rate, such as, for example, an ultrasonic flowmeter, an orifice meter, a turbine flowmeter, a vortex flowmeter, or an electromagnetic flowmeter. The flowmeter 14 should be positioned downstream of the flow conditioner 12 at a distance sufficient to isolate the flowmeter 14 from upstream piping disturbances. This distance is usually expressed as a multiple of pipe diameters and is determined by the meter manufacturer or specified by a standard producing body, such as the American Gas Association (AGA), American National Standards Institute (ANSI), or the American Petroleum Institute (API). For purposes of illustration, the flowmeter 14 depicted in FIG. 3 is an ultrasonic flowmeter. The preferred flowmeter 14, in conjunction with the computer processor 40, can make two separate velocity measurements and two separate speed of sound measurements. The preferred flowmeter 14 also includes a tap for attachment of a pressure transducer 19. Alternatively, the pressure transducer 19 may be installed along the pipe section 13 at a location near the flowmeter 14.

Measured data is collected by the processor 40 from the differential pressure transducer 16, the pressure transducer 19, the flowmeter 14, and the temperature transducer 18. The differential pressure transducer 16 measures the differential pressure across the flow conditioner 12. The ultrasonic flowmeter 14 preferably includes two pairs of ultrasonic transducers 42, 44 and 46, 48 that measure the transit time of ultrasonic signals as they travel diagonally through the flow stream 15 between each of the transducer pairs 42, 44 and 46, 48.

Based on the transit times measured by the flowmeter 14, and utilizing equations (5) through (8) defined above, the processor 40 can measure two separate velocities ($V_{vm}$) and two separate speed of sound ($c_{us}$) values in the flow stream. Using equation (9) defined above, two separate volumetric flow rates ($Q_{vm}$) can also be calculated. Thus, as is well known in the art and utilized in the present invention, the flowmeter 14 determines the volumetric flow rate ($Q_{vm}$) through a pipeline.

The present invention also allows for a separate determination of volumetric flow rate ($Q_{fc}$) utilizing the pressure drop measured by the differential pressure transducer 16 across the flow conditioner 12. This is possible because the flow conditioner 12 acts much like an orifice meter. Using the experimentally determined loss coefficient ($k_{fc}$) of the flow conditioner 12, the differential pressure ($\Delta p_{fc}$) across the flow conditioner 12 is defined as:

$$\Delta p_{fc} = k_{fc} \frac{1}{2} \rho_k V_{fc}^2, \quad \text{and solving for } V_{fc} \text{ (velocity) gives} \tag{10}$$

$$V_{fc}^2 = \frac{2\Delta p_{fc}}{k_{fc} \rho_k} \quad \text{therefore,} \tag{11}$$

$$V_{fc} = \sqrt{\frac{2\Delta p_{fc}}{k_{fc} \rho_k}} \quad \text{or} \tag{12}$$

$$V_{fc} = \frac{1}{\sqrt{k_{fc}}} \sqrt{\frac{2\Delta p_{fc}}{\rho_k}} \tag{13}$$

Per equation (9) defined above, volumetric flow rate ($Q_{fc}$) equals the cross-sectional area of the pipe section ($A_p$) multiplied by the velocity- ($V_{fc}$) of the flow stream as follows:

$$Q_{fc} = V_{fc} \times A_p = \frac{A_p}{\sqrt{k_{FC}}} \sqrt{\frac{2\Delta p_{fc}}{\rho_k}} \tag{14}$$

Therefore, utilizing a known or measured density ($\rho_k$) of the flow medium, the volumetric flow rate ($Q_{fc}$) of the flow stream can be calculated by measuring the differential pressure ($\Delta p_{fc}$) across the flow conditioner 12.

The calculated volumetric flow rate ($Q_{fc}$) through the flow conditioner 12 provides additional data for the operator to verify the operation of the flowmeter 14. Namely, the processor 40 continuously compares the volumetric flowrate ($Q_{vm}$) measured by the flowmeter 14 with the calculated volumetric flow rate ($Q_{fc}$) through the flow conditioner 12 to identify actual flow rate changes versus problems with the measurement devices 12, 14. Although the flow rate values $Q_{vm}$, $Q_{fc}$ will not be identical, the relationships between these values should remain constant over time. For example, the value of the measured $Q_{vm}$ may equal a certain percentage of the value of the calculated $Q_{fc}$, and that percentage should remain constant over time. Therefore, in the configuration of FIG. 3, the flow conditioner 12 acts to condition the flow and also acts as a check meter for the primary flowmeter 14. This is especially advantageous because most existing metering systems, such as metering system 10, already include a flow conditioner 12 upstream of a flowmeter 14. Therefore, only a differential pressure transducer 16 is required for the flow conditioner 12 to perform the function of a check meter.

As understood by one of ordinary skill in the art, the density ($\rho$) of the flow stream may be calculated using standard compressibility data, e.g. AGA 8, based on the measured pressure and temperature in the pipeline and knowing the composition of the flow stream. The measured velocity ($V_{vm}$) from the flowmeter 14 and the measured differential pressure ($\Delta p_{fc}$) across the flow conditioner 12 can also be used to calculate the density ($\rho_c$) of the flow medium. Starting with equation (10) defined above, and solving for density ($\rho_c$) yields:

$$\rho_c = \frac{2\Delta p_{fc}}{k_{fc} V_{vm}^2} \quad \text{where} \tag{15}$$

$k_{fc}$ is the loss-coefficient of the flow conditioner 12, which is a known value, experimentally determined for each flow conditioner 12. Therefore, using the flow velocity ($V_{vm}$) measured by the flowmeter 14, an approximation of the density ($\rho_c$) of the flow medium can be determined. Although the separately determined values of the flow stream density ($\rho_c$, $\rho_k$) will not be identical, the relationship between their values should remain constant over time.

As described above, the speed of sound ($c_{us}$) in the flow stream 15 can be determined directly from the ultrasonic flowmeter 14 data. Because the preferred ultrasonic flowmeter 14 has two pairs of transducers (42, 44 and 46, 48), two separate measurements of the speed of sound ($c_{us}$) may be calculated using the flowmeter 14 data. A separately calculated speed of sound ($c_c$) can also be determined for a liquid flow stream 15 utilizing the liquid density. Namely, the speed of sound ($c_c$) in a liquid of a known density ($\rho_k$) can be determined as follows:

$$c_c = \sqrt{\frac{E_s}{\rho_k}} \tag{16}$$

where $E_s$ is the bulk modulus of elasticity of the fluid, which is a constant.

Further, a separately calculated speed of sound ($c_c$) can also be determined for a gaseous flow stream 15 as follows:

$$c_c = \sqrt{\gamma RT} \quad \text{and} \tag{17}$$

$$\gamma = \frac{c_p}{c_v} \quad \text{where} \tag{18}$$

$c_p$ is the specific heat of the gas at constant pressure, $c_v$ is the specific heat of the gas at constant volume, R is the gas constant, and T is the absolute temperature of the flow stream 15. Therefore, the speed of sound ($c_c$) in the flow stream 15 can also be determined using independent methods and those results continuously monitored by the processor 40 and compared to the measured speed of sound ($c_{us}$) for any divergence in the relationship between the measured and calculated values.

As described above, the preferred flowmeter 14 is an ultrasonic meter having two distinct measurement paths between two pairs of transducers 42, 44 and 46, 48. This configuration allows for two separate calculations of flow velocity ($V_{us}$) and speed of sound ($c_{us}$) utilizing equations (7) and (8) above, thereby providing an internal check on the operation of the ultrasonic flowmeter 14. Additional diagnostic capabilities are provided by using the preferred ultrasonic flowmeter 14 in conjunction with the differential pressure transducer 16 adapted to measure across the flow conditioner 12. If the flow conditioner 12 is functioning properly, the two measurement paths of the ultrasonic meter 14 should measure approximately the same flow stream velocity ($V_{us}$). However, if debris collects in the flow conditioner 12, or other operational problems occur, the flow conditioner 12 will not properly condition the flow, so the velocity profile entering the ultrasonic flowmeter 14 will be disturbed. A disturbed velocity profile will likely cause the ultrasonic meter 14 to measure very different flow stream velocities ($V_{us}$) along the two measurement paths. Further, the differential pressure ($\Delta p_{fc}$) across an obstructed flow conditioner 12 will also increase. Therefore, if a deviation between the two flow stream velocities ($V_{us}$) measured by the ultrasonic flowmeter 14 is accompanied by an increased differential pressure ($\Delta p_{fc}$) across the flow conditioner 12, then the flow conditioner 12 is likely obstructed. If the deviating flow velocities ($V_{us}$) as measured along the two paths of the flowmeter 14 are not accompanied by an increased differential pressure, then there is likely an error in the velocity ($V_{us}$) measurements of the flowmeter 14. Therefore, the present invention provides additional diagnostic advantages not present in the prior art.

While, the above example is directed to the use of an ultrasonic flowmeter as the primary meter 14, many of the same concepts are applicable with other types of velocity meters, such as, for example, turbine, vortex, and electromagnetic meters. The present invention also finds useful application with an orifice meter as the primary meter 14. As expressed by equation (1) above, the volumetric flow rate (Q) through an orifice meter or any other differential pressure device, including the flow conditioner 12, is determined based on the measured differential pressure ($\Delta p$) and known or measured density ($\rho_k$) of the flow stream. Therefore, because the volumetric flow rate ($Q_{\Delta p}$) through an orifice meter, as expressed by equation (1), and the volumetric flow rate ($Q_{fc}$) through the flow conditioner 12, as expressed by equation (14), each rely on the known density ($\rho_k$), the two volumetric flow rates can be expressed as a ratio to eliminate the density term, as follows:

$$\frac{Q_{\Delta p}}{Q_{fc}} = \frac{CEA_o\sqrt{\frac{2\Delta p_o}{\rho_k}}}{\frac{A_p}{\sqrt{k_{FC}}}\sqrt{\frac{2\Delta p_{fc}}{\rho_k}}} = \frac{CEA_o\sqrt{2\Delta p_o}}{\frac{A_p}{\sqrt{k_{FC}}}\sqrt{2\Delta p_{fc}}} \tag{19}$$

The variables on the right side of equation (19) are constants except for the measured differential pressures. Therefore:

$$\frac{Q_{\Delta p}}{Q_{fc}} \propto \frac{\sqrt{\Delta p_o}}{\sqrt{\Delta p_{fc}}} \tag{20}$$

Thus, the ratio on the right side of equation (20), or alternatively, the ratio of the differential pressures, can be monitored since this ratio should remain constant over time absent operational problems with either the orifice meter or the flow conditioner 12.

While preferred embodiments of the present invention have been shown and described, those of ordinary skill in the art will understand that various modifications thereto can be made without departing from the scope of the present invention. For example, while an ultrasonic flowmeter is shown and described, the benefits of the present invention are equally applicable for other velocity meters. It is also understood that the present invention finds usefulness with orifice meters and other differential pressure measurement devices. Likewise, while various steps may be disclosed or claimed in a particular order herein, it is not intended that any particular order be required unless such order is inherent in the carrying-out of the claim or explicitly recited.

What is claimed is:

1. A system for monitoring the conditions of a flow stream in a pipeline comprising:
   a flow conditioner positioned in said pipeline upstream of a meter;
   said meter;
   means for measuring a differential pressure across said flow conditioner; and
   a processor that collects data from said flow conditioner and said meter.

2. The system of claim 1 further comprising a temperature transducer and a pressure transducer.

3. The system of claim 1 wherein said meter is a velocity flowmeter.

4. The system of claim 3 wherein said meter is an ultrasonic flowmeter.

5. The system of claim 4 wherein said ultrasonic flowmeter comprises at least two pairs of transducers.

6. The system of claim 3 wherein said meter is a turbine flowmeter.

7. The system of claim 3 wherein said meter is an electromagnetic flowmeter.

8. The system of claim 3 wherein said meter is a vortex flowmeter.

9. The system of claim 1 wherein said meter is a differential pressure device.

10. The system of claim 9 wherein said meter is an orifice meter.

11. A method for monitoring the conditions of a flow stream in a pipeline comprising:
- measuring a differential pressure across a flow conditioner positioned in the pipeline upstream of a flowmeter;
- calculating a first volumetric flow rate through the pipeline using the measured differential pressure;
- measuring a second volumetric flow rate using the flowmeter;
- comparing the first volumetric flow rate to the second volumetric flow rate.

12. The method of claim 11 further comprising:
- measuring a pressure and a temperature of the flow stream;
- determining a velocity of the flow stream using the flowmeter;
- calculating a first density of the flow stream using the measured pressure and temperature;
- calculating a second density of the flow stream using the measured differential pressure and the measured velocity; and
- comparing the first density to the second density.

13. The method of claim 12 further comprising:
- determining a first speed of sound of the flow stream using the flowmeter;
- calculating a second speed of sound in the flow stream; and
- comparing the first speed of sound to the second speed of sound.

14. The method of claim 13 wherein the second speed of sound is calculated using the measured temperature and pressure of the flow stream.

15. The method of claim 13 wherein the second speed of sound is calculated using the second density and the measured pressure.

16. A method for monitoring the conditions of a flow stream in a pipeline comprising:
- measuring a first differential pressure across a flow conditioner positioned in the pipeline upstream of a meter;
- measuring a second differential pressure across a the meter; and
- monitoring the ratio of the first differential pressure to the second differential pressure.

17. A method for monitoring the conditions of a flow stream in a pipeline comprising:
- measuring a first differential pressure across a flow conditioner positioned in the pipeline upstream of a meter;
- calculating a first volumetric flow rate from the first measured differential pressure;
- measuring a second differential pressure across the meter;
- calculating a second volumetric flow rate from the second measured differential pressure; and
- comparing the first volumetric flow rate to the second volumetric flow rate.

18. A method for monitoring the performance of a flow conditioner in a pipeline comprising:
- determining a first fluid velocity along a first measurement path of a flowmeter;
- determining a second fluid velocity along a second measurement path of the flowmeter; and
- comparing the first fluid velocity to the second fluid velocity;
- wherein the flow conditioner is functioning properly when the first fluid velocity is substantially equal to the second fluid velocity.

19. The method of claim 18 wherein either the flow conditioner or the flowmeter is not functioning properly when the first fluid velocity is not substantially equal to the second fluid velocity.

20. The method of claim 18 further comprising measuring a differential pressure across the flow conditioner, wherein a differential pressure increase may indicate that the flow conditioner has debris trapped therein.

* * * * *